United States Patent
Baker

[15] 3,662,844
[45] May 16, 1972

[54] DETACHABLE POWER AUGER ASSEMBLY

[72] Inventor: Edward C. Baker, 200 Hawthorn Road, Marshall, Mich. 49068

[22] Filed: July 6, 1970

[21] Appl. No.: 52,539

[52] U.S. Cl. ................................................. 175/18, 173/26
[51] Int. Cl. ......................................................... F25c 5/04
[58] Field of Search ................... 175/207, 211, 209, 18, 220; 173/140, 26

[56] References Cited

UNITED STATES PATENTS

| | | | |
|---|---|---|---|
| 2,723,835 | 11/1955 | Reese et al. | 175/18 |
| 2,576,199 | 11/1951 | Vogel | 173/140 X |
| 2,991,838 | 7/1961 | Lane | 175/220 |
| 630,865 | 8/1899 | Dalbey | 175/18 X |
| 2,393,282 | 1/1946 | Berlin | 175/18 |
| 2,625,835 | 1/1953 | Marek | 173/140 |
| 2,745,653 | 5/1956 | Deason | 173/140 X |
| 3,131,777 | 5/1964 | Snider | 175/18 |

Primary Examiner—Joseph H. McGlynn
Assistant Examiner—Richard E. Favreau
Attorney—Roy A. Plant

[57] ABSTRACT

A portable power auger attachment designed for boring holes in ice for fishermen is provided which is adapted to be connected to a portable power source, as for example the gasoline engine of a snowmobile. The auger comprises a flexible shaft, means for coupling one end of the shaft to the power source, and an auger blade assembly connected to the other end of the shaft including an auger blade mounted in a tubular support and having a housing axially slidable on said support serving as a guide and protective guard for the blade assembly.

5 Claims, 5 Drawing Figures

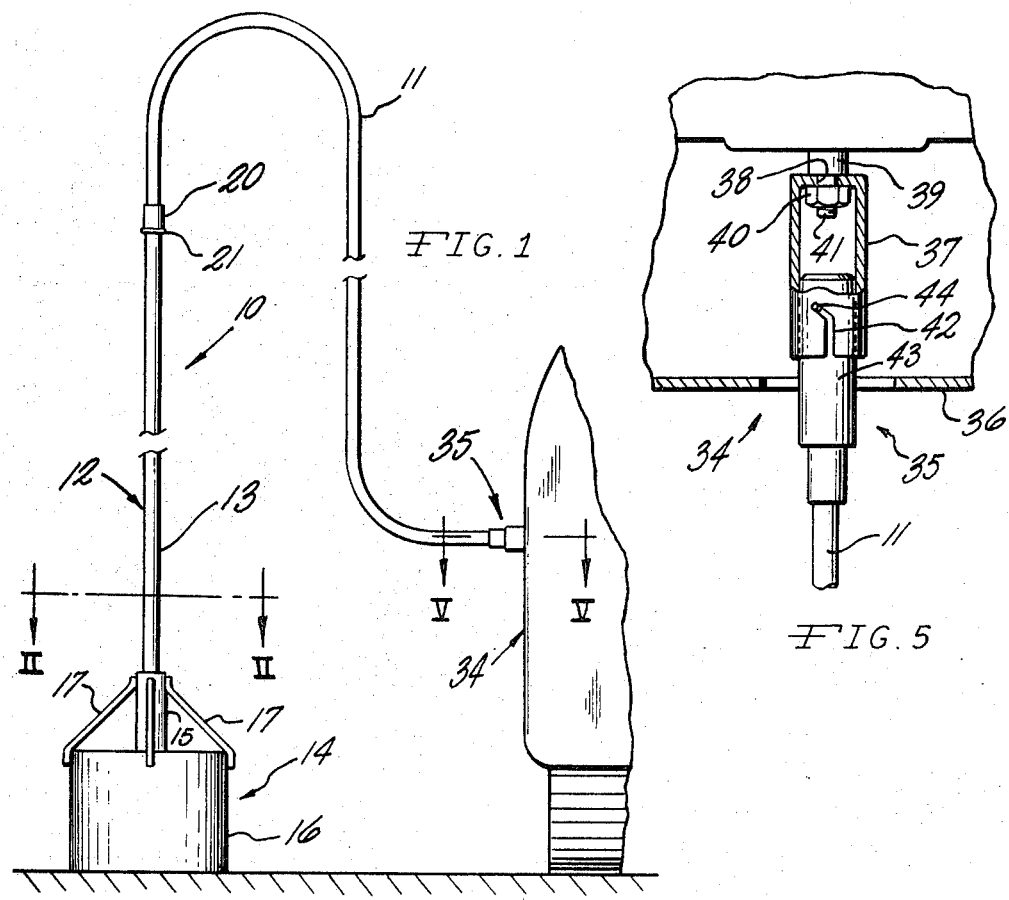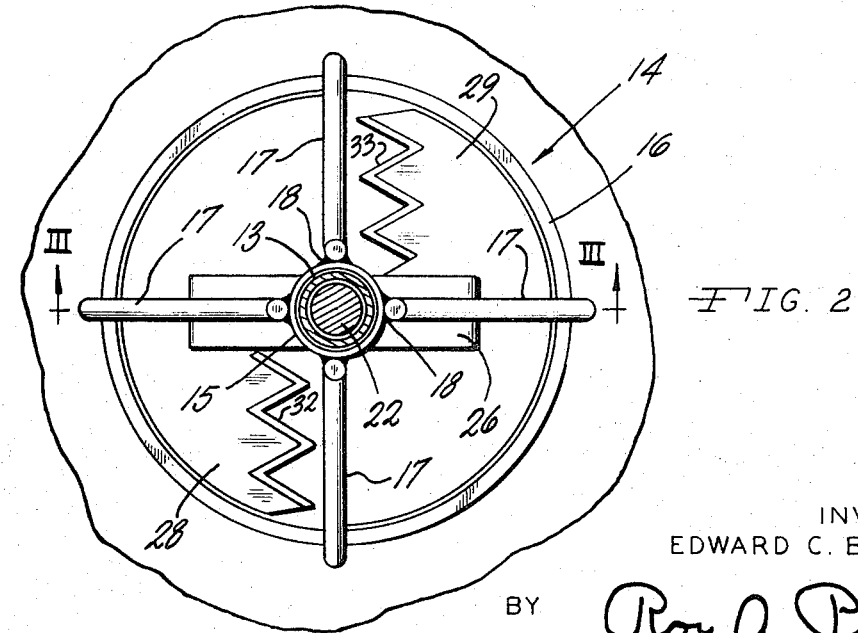

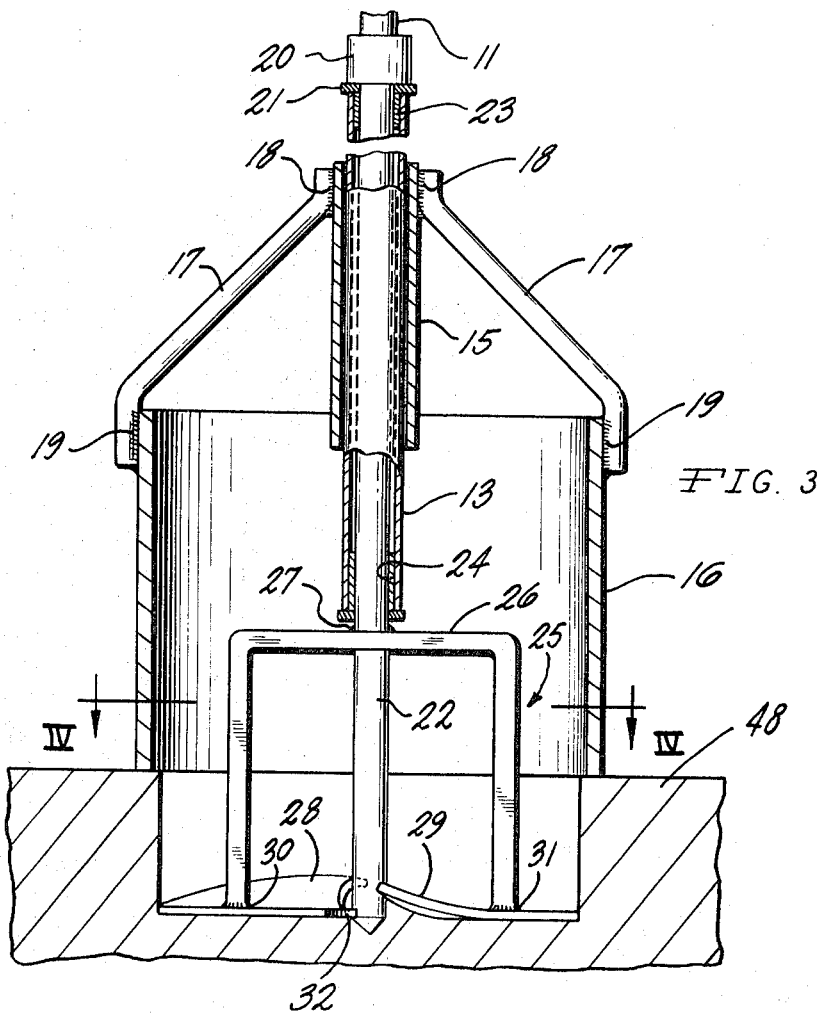
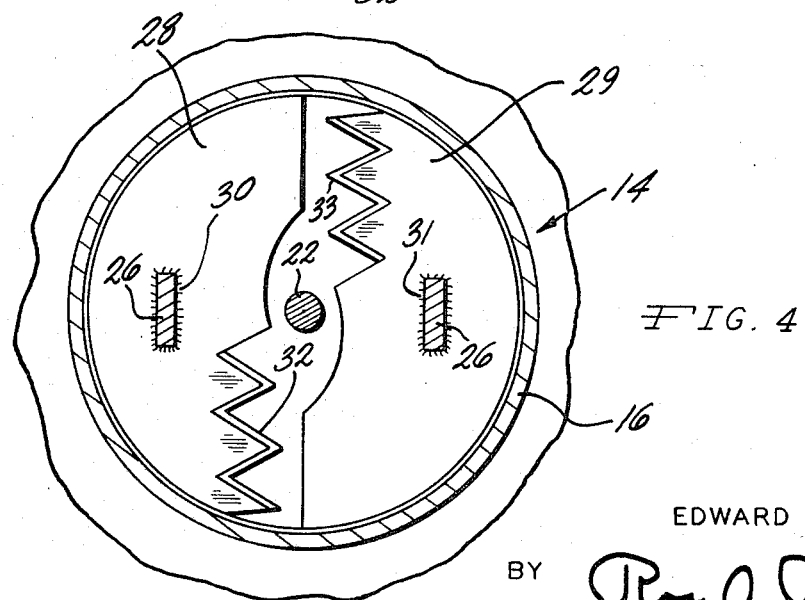
INVENTOR
EDWARD C. BAKER
BY Roy A. Plant
ATTORNEY

DETACHABLE POWER AUGER ASSEMBLY

BACKGROUND OF THE INVENTION

Ice fishing has become an extremely popular winter sport. In order to fish through the ice, it is necessary to provide a hole through which to lower the fishing line. In the past, this has been done by primitively chopping a hole in the ice with an axe or a bar. In some cases hand-operated augers have been utilized. More recently, ice boring tools have been provided utilizing an auger powered by a self-contained gasoline engine. Such devices are very expensive when considered in the light of the small amount of operating time during which the device is used for the ordinary sports fisherman. Moreover, such devices are extremely heavy and bulky and difficult to manipulate and transport to the desired location.

SUMMARY OF THE INVENTION

The present invention relates to apparatus for boring holes in ice, and more particularly refers to an attachment including an auger boring blade, which attachment is adapted to be connected to an available power source.

Accordingly, it is an object of the invention to provide an improved power-driven device for cutting holes in ice.

It is another object to provide a power-driven device for cutting holes in ice which is relatively light and easy to manipulate.

It is further an object to provide a device of the type described in the form of an attachment which may be utilized in conjunction with commonly available power sources which may be normally brought to the fishing site.

It is an additional object to provide an ice boring device having a guide for properly positioning and protecting the cutting blade.

It is still a further object to provide an ice boring device of the type described which is relatively simple and inexpensive to produce.

Still further objects and advantages of the invention will appear as the description proceeds.

To the accomplishment of the foregoing and related ends, the invention, then, consists of the ice boring device herein fully described and particularly pointed out in the claims, the annexed drawings and the following description setting forth in detail a certain illustrative embodiment of the invention, such disclosed embodiment illustrating, however, one of the various ways in which the principle of the invention may be used.

BRIEF DESCRIPTION OF THE DRAWINGS

In the annexed drawings:

FIG. 1 is a side elevational view of the ice boring apparatus of the invention.

FIG. 2 is a top view of a portion of the apparatus of the present invention, partly in cross-section, as taken at line II—II of FIG. 1, looking in the direction of the arrows.

FIG. 3 is a partially cross-sectioned axial sectional view of the apparatus as taken along line III—III of FIG. 2, looking in the direction of the arrows.

FIG. 4 is a cross-sectional view of the apparatus as taken along line IV—IV of FIG. 3, looking in the direction of the arrows; and FIG. 5 is a fragmentary cross-sectional view as taken along line V—V of FIG. 1, looking in the direction of the arrows.

DESCRIPTION OF THE SPECIFIC EMBODIMENT

Referring to FIG. 1, an ice boring attachment 10 according to the invention is shown. The device comprises a flexible rotary drive shaft 11 having an outer sheath an an inner drive cable, of the type generally available on the market, and a guide assembly 12. The guide assembly comprises a tubular guide, support or pipe 13, and a housing assembly 14 comprising a tube 15 slidably mounted over the tubular guide 13, a cylindrical housing 16, and support rods 17 affixed at one end to the guide 13 by means of welds 18, and at the other end to the cylindrical housing 16 by means of welds 19 (FIGS. 2, 3 and 4). As a result the housing assembly is axially slidable over the guide 13. The stationary sheath of the flexible rotary drive shaft 11 is affixed at one end to the tubular guide 13 by means of a coupling 20 and washer 21, FIGS. 1 and 3. A drive shaft 22, FIG. 2, is rotatably disposed within the tubular guide 13 and supported by oilite bearings 23 and 24, FIG. 3. The end of the drive shaft 22 is operatively connected to the central drive cable (not shown) of the flexible rotary drive shaft 11.

At the lower end of the drive shaft 22 is an auger blade assembly 25 comprising an inverted U-shaped or supporting yolk 26 affixed to the drive shaft 22 by means of a weld 27 (FIGS. 2, 3 and 4). A pair of semi-circular auger blades 28 and 29 are affixed to the ends of the supporting yolk 26 by welds 30 and 31, FIG. 4. The blades 28 and 29 are preferably provided with sawteeth 32 and 33 at their leading or cutting edges, the blades being adapted to revolve counterclockwise when viewed in a downward direction (FIGS. 2 and 4).

Referring to FIGS. 1 and 5, the device of the present invention is shown connected to the engine of a snowmobile 34. The flexible rotary drive shaft 11 is connected by means of a coupling 35 which extends through an opening in the protective housing 36 of the snowmobile 34, and comprises a female member in the form of a cylindrical cup 37 having a hole 38 provided at its bottom, the cup 37 being affixed to the drive shaft 39 by means of a nut 40 engaging the threaded end 41 of the drive shaft. The cylindrical cup 37 may be left permanently affixed to the drive shaft and does not interfere with the proper operation of the snowmobile engine. If desired a cap or plug (not shown) may be affixed to the cup 37 for physical protection of the operator or other persons. The cylindrical cup 37 is provided with a cam slot 42 at its lip. The male member of the coupling comprises a plug 43 affixed to the end of the drive cable (not shown) of the flexible rotary drive shaft 11, and is provided with a follower pin 44 adapted to engage the cam slot 42. Although a cam lock type is shown, other known forms of couplings may be utilized, such as a ball wedge lock or similar types of quick-disconnect devices.

To place the ice boring device of the present invention in operation, the nut 40 is removed and the cylindrical cup 37 placed over the threaded portion of the shaft 41 and bolted in place. The plug 43 is then inserted into the cup and rotated so that the follower pin 44 is engaged within the cam slot 42. The engine of the snowmobile 34 is then started, causing the auger blade assembly 25 to rotate. The cylindrical housing 16 is placed on the ice in the location where it is desired to bore a hole. The tubular guide 13 is then grasped and a downwardly directed force applied, forcing the blade assembly 25 against the ice. The cylindrical housing 16 remains on the surface of the ice and serves as a guide to maintain the blade assembly 25 in proper position. It also serves to contain the ice chips which form and prevents them from being thrown laterally. The housing 16 also serves as a guard for the auger blade assembly 25 and prevents injury to the operator. The blade assembly continues to bore into the ice, and, as it descends into the hole which is being bored, the tube 15 slides over the tubular guide 13, permitting the housing 16 to remain at the surface of the ice so that it can continue to retain the chips which result from the boring operation. In a short time a clean hole is bored through the ice which is suitable for use in fishing. Because snowmobile engines develop a substantial amount of power, the process may be very quickly done with very little effort. It has been found that a standard hole can be bored into ice with the present invention in less than a minute when the thickness of the ice ranges from about 6 inches to about 2 feet.

The ice boring device of the present invention has a number of advantages over prior art equipment designed for the same purpose. First, because it is an attachment designed to be used with a separate power source and does not have its own integral engine, it is very light and relatively inexpensive. Although it can be utilized in conjunction with other types of power sources, it is particularly designed to be used in conjunction with the gasoline engine of a snowmobile, since snowmobiles are now widely used to transport fishermen to the proper ice fishing site. Since commonly available snowmobile engines developed a relatively large amount of horsepower, the auger operates very rapidly and very efficiently and without much effort on the part of the operator. The cylindrical housing 16 serves as a guide for the auger, and additionally protects the operator from injury by preventing physical contact with the moving auger, as well as from flying chips. Moreover, the device may be readily assembled from standard components available on the market. The blade assembly may be fabricated from readily obtainable materials and requires only a relatively small number of machine operations. Although in the embodiment shown blades having sawteeth are utilized, other types may be substituted such as spoon, knife, screw, chippers, or other standard ice-removing blades.

While but one form of the invention has been shown and described, other forms within the spirit and scope of the invention will now be apparent to those skilled in the art. Therefore, the embodiment shown in the drawings is to be considered as merely setting forth a preferred form of the ice boring device for illustrative purposes, and is not intended to limit the scope of the invention herein described, shown and claimed.

Other modes of applying the principle of my invention may be employed instead of the one explained, change being made as regards the means or structure herein disclosed, provided those stated by any of the following claims or their equivalent be employed.

I therefore particularly point out and distinctly claim as my invention:

1. An ice boring apparatus adapted to be connected to a rotary power source, comprising:
   a. a tubular support,
   b. a drive shaft rotatably mounted in said support and adapted at one end to be connected to a flexible drive cable,
   c. a rotary blade assembly affixed to the other end of said drive shaft,
   d. a housing mounted on said tubular support and adapted to slide axially thereon comprising:
      1. a sleeve slidably mounted on said tubular support,
      2. a cylindrical housing adapted to encircle said blade assembly in close proximity thereto, and
      3. means affixing said cylindrical housing to said sleeve, said cylindrical housing being adapted in its lowermost position to surround said blade assembly in close proximity thereto and to permit said blade assembly to rotate therein, and said cylindrical housing further being adapted to engage the surface of the ice during the entire drilling process; and
   e. a flexible rotary drive shaft connected at one end to the other end of said drive shaft and having coupling means at the other end for connecting said flexible drive cable to said rotary power source.

2. An ice boring apparatus according to claim 1, wherein said drive shaft is journaled in annular bearings mounted in said tubular support.

3. An ice boring apparatus according to claim 1, wherein said coupling means comprises a cylindrical cup form female member having an axial channel and a cam slot provided in the lip thereof and a cylindrical male member adapted to be inserted in the axial channel of said female member and having a follower pin provided thereon adapted to engage said cam slot.

4. An ice boring apparatus according to claim 1, wherein said rotary blade assembly is provided with a sawtooth cutting edge.

5. An ice boring apparatus according to claim 1, wherein said rotary blade assembly comprises an inverted U-form yoke and a pair of semi-circular blades having sawteeth at their cutting edge, one of said blades being affixed to one end of said yoke and the other blade of said pair to the other end of said yoke, wherein rotation of said yoke will actuate said blades in ice boring manner.

* * * * *